US006171429B1

(12) United States Patent
Aindow et al.

(10) Patent No.: US 6,171,429 B1
(45) Date of Patent: Jan. 9, 2001

(54) PRINTING METHOD AND APPARATUS

(75) Inventors: Alan Michael Aindow, Hilo, HI (US); Michael John Cahill; David Santon, both of Coventry (GB)

(73) Assignee: Molins, PLC, London (GB)

(*) Notice: Under 35 U.S.C. 154(b), the term of this patent shall be extended for 0 days.

(21) Appl. No.: 08/930,053

(22) PCT Filed: May 22, 1996

(86) PCT No.: PCT/GB96/01227

§ 371 Date: Apr. 21, 1998

§ 102(e) Date: Apr. 21, 1998

(87) PCT Pub. No.: WO96/37368

PCT Pub. Date: Nov. 28, 1996

(30) Foreign Application Priority Data

May 22, 1995 (GB) ..................... 9510430

(51) Int. Cl.[7] ..................... B44C 1/17; B44C 1/14; B32B 31/20; B41M 3/12

(52) U.S. Cl. ..................... 156/234; 156/230; 156/233; 156/240; 156/247; 156/499; 156/540; 427/147; 427/148; 428/914; 428/915

(58) Field of Search ..................... 156/230, 231, 156/232, 233, 234, 238, 237, 240, 241, 247, 277, 289, 272.2, 497, 499, 540, 541; 427/146, 147, 148; 428/914, 915

(56) References Cited

U.S. PATENT DOCUMENTS

| | | | | |
|---|---|---|---|---|
| 4,239,569 | * | 12/1980 | Harvey | 156/156 |
| 4,340,438 | * | 7/1982 | Davis | 156/234 |
| 4,389,438 | * | 6/1983 | Ohtsuki et al. | 428/35 |
| 4,724,026 | * | 2/1988 | Nelson | 156/233 |
| 5,021,112 | * | 6/1991 | Breger | 156/305 |
| 5,520,763 | * | 5/1996 | Johnstone | 156/233 |
| 5,882,463 | * | 7/1982 | Tompkin et al. | 156/234 |

FOREIGN PATENT DOCUMENTS

| | | | | |
|---|---|---|---|---|
| 2255317 | * | 11/1992 | (GB) | 156/230 |
| 95810302 | * | 11/1992 | (EP) | B32B/31/04 |

* cited by examiner

*Primary Examiner*—James Sells
*Assistant Examiner*—J. A. Lorengo
(74) *Attorney, Agent, or Firm*—Antonelli, Terry, Stout & Kraus, LLP

(57) ABSTRACT

In security printing apparatus for attaching a foil imprint of predetermined shape to stock (10) such as bank note sheets, a tape (8; 108)) carrying foil to be printed and a layer of hot-melt adhesive is conveyed with the stock past a heated printing roll (2; 102). In order to allow high printing speeds the adhesive is at least partially activated by pre-heating just prior to printing. The pre-heating means may comprise hot air, radiation or heated guide means for the foil carrier web. Details of pattern or shape may be etched on the foil, either before or after printing, by means of laser beam, the details being defined by a mask moving with the foil.

13 Claims, 3 Drawing Sheets

PRINTING METHOD AND APPARATUS

This invention relates to printing apparatus, and in particular to such apparatus for carrying out a process commonly known as hot foil stamping.

In security printing apparatus it is known to apply a thin layer of metal foil of predetermined shape and/or pattern to a stock, e.g. a sheet of bank notes, usually as a feature intended to make counterfeiting more difficult. In a typical application the foil is carried as a continuous lamination between a carrier substrate and a layer of hot melt adhesive, the shape or pattern to be applied being determined by a stamp or press. In prior art arrangements the carrier substrate and the stock (e.g. a sheet of bank notes) are placed together beneath a platen-type press carrying an array of stamps which are simultaneously applied to cause an array of hot foil imprints to be applied to the stock. Heat for activating the hot melt adhesive is generally applied from the press, and an inability to transfer heat sufficiently quickly is a factor in limiting the speed of such prior art arrangements.

U.S. Pat. No. 4,340,438 discloses an arrangement for transferring a foil from a carrier substrate to a moving stock in which a thermal belt contacts the rear surface of the carrier substrate in the vicinity of a pressure-applying transfer station, so as to preheat the foil sufficiently to effect separation from the carrier and transfer it to the stock.

Japanese patent publication No. 6115048A discloses an arrangement for bonding a plastic film web to a stock web by passage between presser rolls, the webs passing over pre-heating rolls upstream of the presser rolls.

According to a first aspect of the invention printing apparatus for applying foil to a stock, comprises means for conveying a carrier for the foil towards a printing position, the foil carrying on an outer side an adhesive which is activated by heat, means for conveying a stock towards said printing position, printing means at which the carrier and stock are moved together past said printing position at which pressure is applied to transfer a predetermined pattern and/or shape of foil from the carrier to the stock and so that the adhesive secures the predetermined pattern and/or shape of foil to the stock, and pre-heating means for transferring heat to the carrier before it reaches the printing position and/or before it contacts the stock, wherein the pre-heating means comprises means arranged to apply heat directly to said adhesive layer from said outer side. Preferably the pre-heating means is effective to transfer heat to the carrier immediately upstream of the printing position. For example, where the printing means comprises a nip between a print wheel and a counter wheel the pre-heating means may be located to be effective as close as possible to said nip. The pre-heating means may comprise means directing radiation or hot air at said layer.

In a preferred arrangement the printing means comprises means for applying both pressure and heat at said printing position. For example, the printing means may comprise a print wheel carrying one or more stamps defining said predetermined pattern and/or shape, the wheel carrying heating means in the vicinity of said stamp or stamps.

The printing apparatus may form part of security printing apparatus of the type disclosed in EP 0441596A, the disclosure of which is hereby incorporated herein in its entirety. This apparatus discloses a security printing process in which thin film security material is transported on a carrier ribbon past a printing position together with a moving stock.

According to another aspect of the invention a method of applying foil to a stock by means of pressure and heat to secure the foil to the stock by means of a hot melt adhesive, in which the foil and stock are moved together past a printing position so that successive foil imprints are made at said position, includes a process step in which the adhesive carried with the foil is pre-heated before it reaches said position, wherein said pre-heating step includes directing heat directly at said adhesive from a direction other than through said foil.

According to a further aspect of the invention a method of applying foil to substrate by means of pressure and heat to secure the foil to the substrate by means of a hot melt adhesive, in which the foil and substrate are moved together past a printing position so that successive foil imprints are made at said position, includes the stop of laser etching the shape or pattern of the foil either upstream or downstream of the printing position. Preferably said laser etching is carried out using a suitably shaped or patterned mask which is moved together with the foil.

The invention will be further described, by way of example only, with reference to the accompanying diagrammatic drawings, in which.

Figure 1:
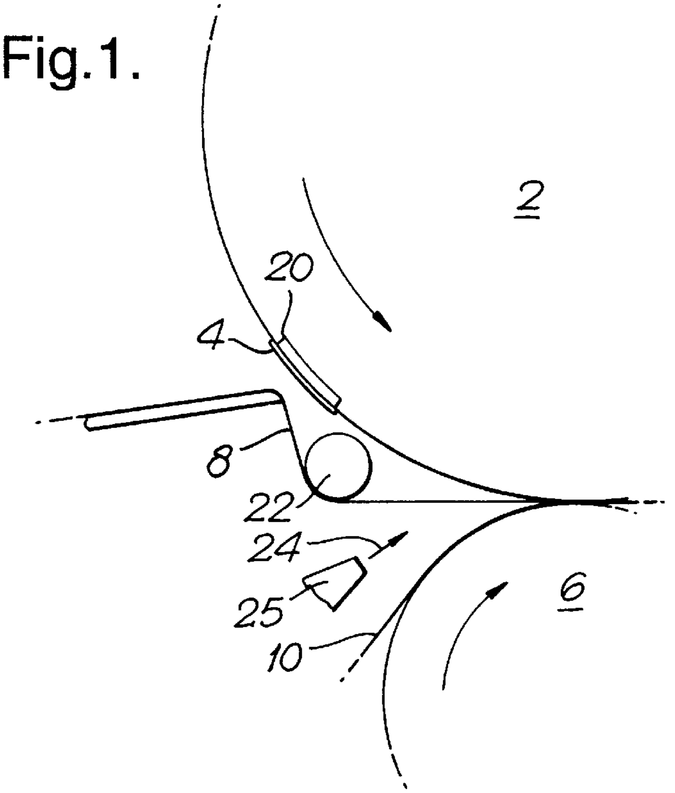
FIG. 1 is a side view of part of a foil printing apparatus.

FIG. 1 shows a driven printing wheel 2 carrying one or more heated dies or stamps 4 which cooperate with a substrate wheel 6. The wheel 6 has a sleeve comprising a flexible polymer printers' makeready. A tape 8 carrying foil to be printed is delivered to the nip of the wheels 2 and 6 along with a web or sheet 10 on which a foil pattern corresponding to that on the stamp 4 is to be printed.

The apparatus shown in FIG. 1 forms part of a security printing machine such as that disclosed in EP 0441596A. In particular, the wheels 2 and 6 correspond to the cylinders 46 and 48 in that machine. The tape 8 is driven in the same manner as the tape 34 in EP 0441596A, that is to say for each printing cycle it is accelerated up to the speed of the web 10 (normally corresponding to the peripheral speed of the wheels 2 and 6), maintained at that speed through the nip between the wheels 2 and 6 while the stamp 4 passes through the nip, and subsequently decelerated to rest and reversed so that the net advance of the tape for each printing cycle only slightly exceeds the length of the image to be imprinted by the stamp 4.

Figure 2:
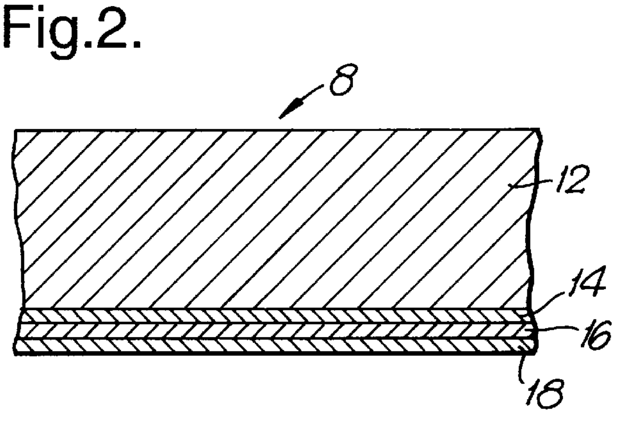
FIG. 2 is a sectional view, not to scale, of a carrier tape including a layer of foil to be printed.

FIG. 2 is a cross-sectional view (not to scale) showing the tape 8, which comprises four layers: a polyester carrier layer 12, a layer 14 of release wax, a layer 16 of foil, typically aluminium, and a layer 18 of a hot melt adhesive. Typical thickness (in mm) for each of the layers of the tape 8 are:

Carrier (12): 0.012–0.030

Release Wax (14): 0.0001

Foil (16): 0.001–0.002

Adhesive (18) 0.001–0.003.

Figure 3:
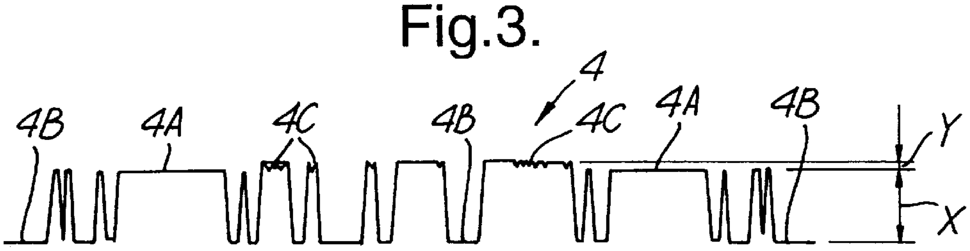
FIG. 3 is a cross-sectional view, not to scale, of a printing stamp usable with the apparatus in FIG. 1.

FIG. 3 is a sectional view of a typical stamp 4, indicating that it comprises areas 4A intended for printing and areas 4B which are relieved, by up to 2 mm as indicated at X, and hence not to be printed. Within some of the areas 4A there are micro-engravings 4C, which are raised by typically 0.02–0.03 mm above the general level of the area (as indicated at Y) and are intended to produce fine detail in the imprint.

In operation, the tape 8 and web 10 travel through the nip which is subject to a high pressure (typically 350–1000 bar) so that the stamp 4 causes a pattern of foil corresponding to that determined by the raised area of the stamp to be released from the carrier layer 12 and to be adhesively secured to the web 10 by means of the hot melt adhesive layer 18 activated by the heated stamp 4. Pressure at the nip is much lower during periods when a stamp 4 is not passing through, so that the tape 8 may be decelerated and reversed as previously explained.

At higher speeds (up to 2 m per second or more) and for detailed patterns to be transferred by the stamp 4 it is important that sufficient heat is transferred to the tape 8 to activate the hot melt adhesive layer 18. Although the stamp 4 is heated, typically to a temperature in the range 120–170° C. by a cartridge heater 20 carried by the wheel 2, there may be insufficient time for adequate heat to penetrate the tape 8 to the layer 18. Increasing further the temperature of the stamp 4 may cause physical damage to the tape 8. In order to provide adequate heat at the layer 18, therefore, pre-heating of the tape 8 is effected by passing it around a heated bar (or roller) 22, which may be heated to a temperature in the range 60–120° C.

Although passing the tape 8 around the bar 22 is effective in providing additional heat just upstream of the position at which printing takes place, this heat is still applied from the side of the tape remote from the adhesive layer 18. Although it is not possible to pass the layer 18 over a heated surface as this would release adhesive on to the surface, additional or alternative pre-heating can be provided on the side of the layer 18 by directing hot air at it just upstream of the nip between wheels 2 and 6, as indicated at 24 in FIG. 1 where hot air is supplied by a blower unit 25. Additionally, or as a further alternative, heat may be supplied by directing infra-red radiation at the layer 18 just upstream of the nip (i.e. the unit 25 could include or consist of an infra-red radiator). The frequency of the radiation may be selected so as to be appropriate to the material of the hot-melt adhesive, i.e. so as to be readily absorbed by it. A further possibility would be to use microwave radiation: this might also be directed from the side of the adhesive layer 18, but could be directed from the other side of the tape 8 and still cause effective activation of the hot melt adhesive.

Any of the means of pre-heating could be used in combination: in all cases the pre-heating is preferably carried out closely adjacent to the printing position, as the thermal mass of the tape 8 is small and its surface area relatively large so that it loses heat and returns to ambient temperature rapidly.

Figure 4:
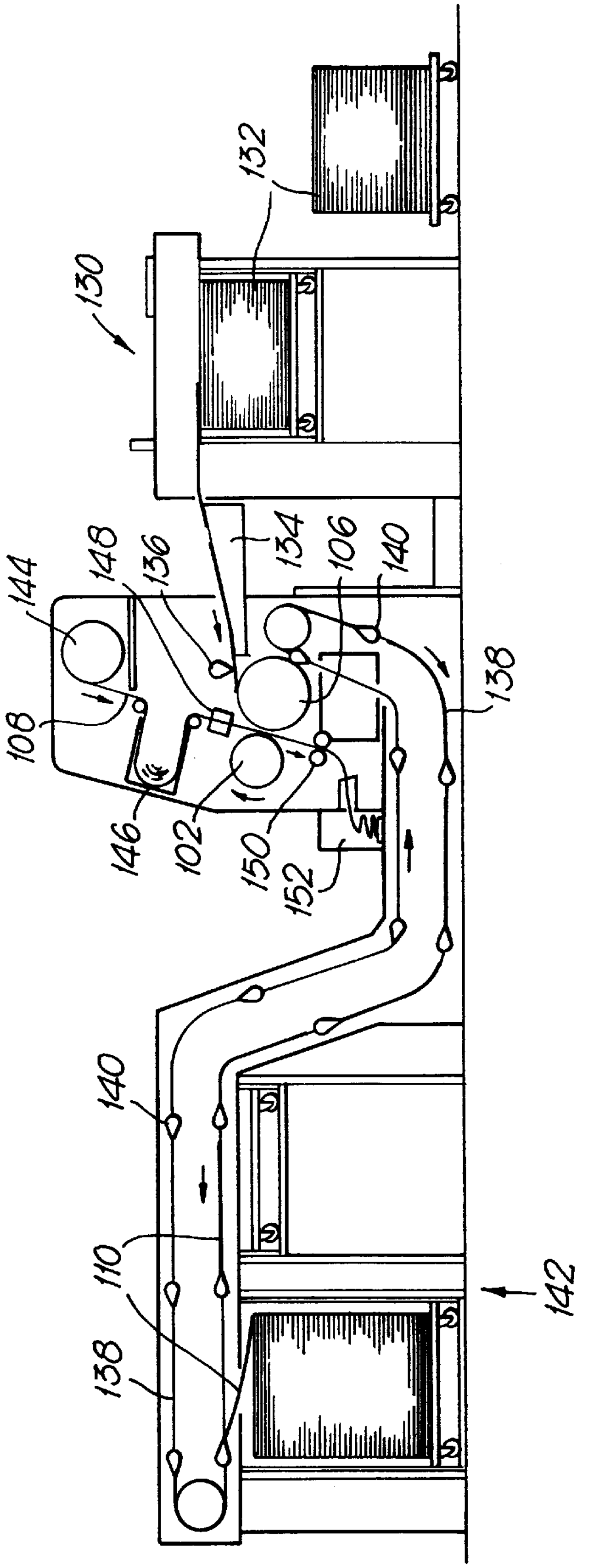
FIG. 4 is a side view of a security printing machine incorporating foil printing apparatus.

The security printing machine shown in FIG. 4 comprises a sheet feeding unit 130 for feeding sheets 110 from successive stacks 132 delivered to the unit. Each successive sheet 110 is fed down a ramp 134 to a lay device 136 which transfers the sheet onto a substrate wheel 106. The wheel 106 cooperates with a print wheel 102 carrying heated stamps (not shown) which are similar to the stamps 4 so as to cause a foil imprint to be applied to the sheet 110 in predetermined positions. Printed sheets 110 are conveyed by suction around the wheel 106 and transferred to a belt conveyor 138 provided with individual sheet grippers 140. The conveyor 138 delivers printed sheets 110 to a stacking unit 142 having two stacking positions.

A carrier tape 108, similar to the tape 8, is delivered from a reel 144 through a suction reservoir 146, which provides tension for the tape, to the nip between the print wheel 102 and the substrate wheel 106. Just upstream of this nip the tape 108 passes a pre-heating unit 148, which comprises infra-red heating elements directing radiation at the adhesive layer of the tape but which could comprise alternatively or additionally any of the other pre-heating means described with reference to FIG. 1 or any other convenient pre-heating means. Downstream of the wheels 102 and 106 the tape 108 passes between drive rolls 150 and is subsequently collected in a waste unit 152.

Figure 5:
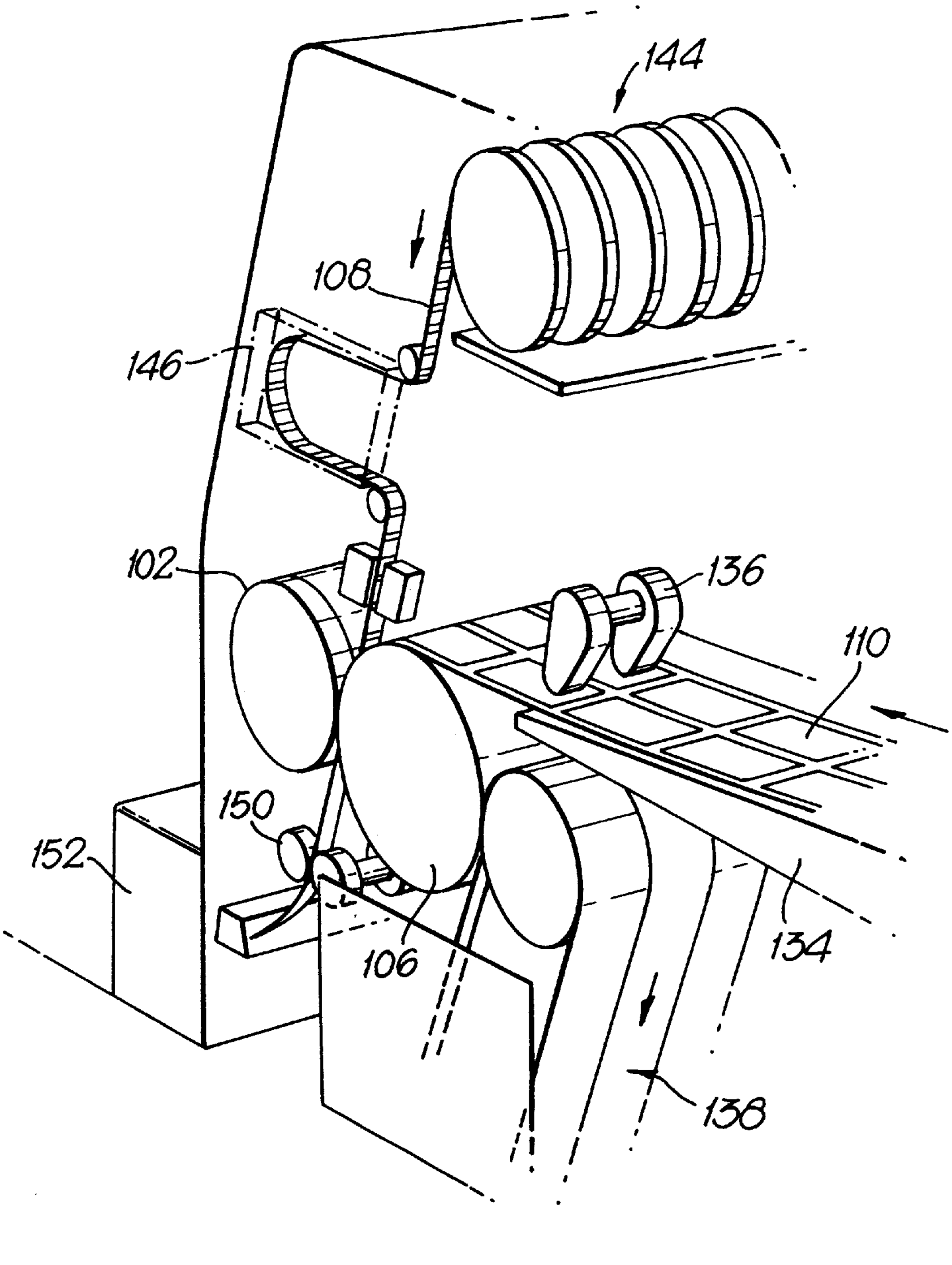
FIG. 5 is a perspective view of the foil printing apparatus in the machine of FIG. 4.

As is apparent from FIG. 5, the reel 144 carries multiple laterally-spaced tapes 108 (although only one tape run is shown in FIG. 5) so that foil imprints can be simultaneously placed at laterally-spaced predetermined positions on the sheets 110 which, as indicated, may comprise several images (e.g. for bank notes) across their widths. The arrangement is similar to that disclosed in EP 0441596A, where each of the sheets to be printed consisted of 10 bank notes across the width and there were correspondingly ten ribbons corresponding to the tape 108.

It is possible to etch details of shape or pattern on the foil by means of a suitable laser beam (e.g. a $CO_2$ laser). The etching may take place on the tape, i.e. before printing, or on the foil applied to the sheet, i.e. after printing, or possibly both before and after printing. The pattern or detail to be etched may be defined by means of a mask moving at the same speed as the tape or sheet: in addition the beam itself may be scanned relative to the tape or sheet. Laser etching may avoid the need for stamps with particularly detailed shapes or patterns, these being provided by the laser in combination with a basic stamp pattern. Clearly the power intensity of the laser beam needs to be closely controlled so as to remove only foil (or foil and adhesive in the case of etching of the tape) without causing damage to the underlying material.

What is claimed is:

1. A method of applying foil to a stock by means of pressure and heat to secure the foil to the stock by means of a hot melt adhesive in which the foil and stock are moved together past a printing position so that successive foil imprints are made at said position, including a process step in which the adhesive carried with the foil is pre-heated substantially immediately upstream of said printing position, wherein said pre-heating step includes directing heat directly at said adhesive from a direction other than through said foil.

2. Apparatus for applying foil to a stock, comprising means for conveying a carrier for the foil towards a printing position, the foil carrying on an outer side thereof an adhesive which is activated by heat, means for conveying a stock towards said printing position, printing means at which the carrier and stock are moved together past said printing position at which pressure is applied to transfer a predetermined pattern or shape of foil from the carrier to the stock and so that the adhesive secures the predetermined pattern or shape of foil to the stock, and pre-heating means for transferring heat to the carrier substantially immediately upstream of the printing position or immediately before it contacts the stock, wherein the pre-heating means comprises means arranged to apply heat directly to said adhesive layer from the outer side.

3. Apparatus as claimed in claim 2, wherein the printing position includes a nip between a printer wheel and a counter wheel and the pre-heating means is arranged to supply heat to the adhesive layer on the carrier as the carrier is delivered into said nip.

4. Apparatus as claimed in claim 2 or 3, wherein the pre-heating means includes means for directing radiation at said adhesive layer.

5. Apparatus as claimed in claim 2 or 3, wherein the pre-heating means includes means for directing hot gas at said adhesive layer.

6. Apparatus as claimed in claim 2 or 3, wherein the printing means includes means for applying both pressure and heat at said printing position.

7. Apparatus as claimed in claim 6, wherein the printing means comprises a print wheel carrying one or more stamps defining said predetermined pattern or shape.

8. A method as claimed in claim 1, further including the step of laser etching the shape or pattern of the foil either upstream or downstream of the printing position.

9. A method as claimed in claim 8, wherein said laser etching is carried out using a mask which is moved together with the foil.

10. Apparatus for applying foil to a stock, comprising means for conveying foil and stock towards and through a printing position formed at least in part by a printer member and a counter member, the foil carrying on an outer side thereof an adhesive which is activated by heat, whereby pressure is applied at the printing position to the foil and the stock to transfer foil to the stock and so that the adhesive secures the foil to the stock, and a pre-heater positioned to transfer heat directly to said adhesive layer from said outer side as said foil approaches the area between said printer member and said counter member.

11. Apparatus as claimed in claim 10, wherein the pre-heater directs radiation at said adhesive layer.

12. Apparatus as claimed in claim 10, wherein said pre-heater directs hot gas at said adhesive layer.

13. Apparatus as claimed in claim 10, wherein said printing member comprises a print wheel carrying one or more stamps defining a predetermined pattern or shape, and said counter member comprises a counter wheel, said pre-heater being positioned to supply heat into the nip between said printer wheel and said counter wheel.

* * * * *